US012058257B2

(12) United States Patent
Liu et al.

(10) Patent No.: US 12,058,257 B2
(45) Date of Patent: Aug. 6, 2024

(54) DATA STORAGE METHOD, DATA READ METHOD, ELECTRONIC DEVICE, AND PROGRAM PRODUCT

(71) Applicant: Dell Products L.P., Round Rock, TX (US)

(72) Inventors: Jinpeng Liu, Shanghai (CN); Chao Chen, Shanghai (CN); Yongjun Shi, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 333 days.

(21) Appl. No.: 17/675,773

(22) Filed: Feb. 18, 2022

(65) Prior Publication Data

US 2023/0239149 A1 Jul. 27, 2023

(30) Foreign Application Priority Data

Jan. 21, 2022 (CN) .......................... 202210074554.0

(51) Int. Cl.
*H04L 9/08* (2006.01)
(52) U.S. Cl.
CPC .................. *H04L 9/0894* (2013.01)
(58) Field of Classification Search
CPC .............................. H04L 9/0894; H04L 9/085
USPC ........................................................... 713/189
See application file for complete search history.

(56) References Cited

U.S. PATENT DOCUMENTS

| 6,084,882 | A  | * | 7/2000  | Ogura    | H04L 45/22  |
|           |    |   |         |          | 370/409     |
| 8,793,320 | B2 | * | 7/2014  | Kamat    | H04L 51/42  |
|           |    |   |         |          | 709/224     |
| 9,613,190 | B2 | * | 4/2017  | Ford     | H04L 63/083 |
| 10,142,377| B2 | * | 11/2018 | Harrison | H04L 67/02  |
| 10,200,314| B1 | * | 2/2019  | Karp     | H04L 67/306 |

(Continued)

OTHER PUBLICATIONS

Dashlane Inc. "Making Security Simple for People and Businesses Everywhere," https://blog.dashlane.com/, Accessed Dec. 21, 2021, 9 pages.

(Continued)

*Primary Examiner* — Amare F Tabor
(74) *Attorney, Agent, or Firm* — Ryan, Mason & Lewis, LLP

(57) ABSTRACT

Embodiments of the present disclosure relate to a data storage method, a data read method, an electronic device, and a computer program product. The data storage method includes: acquiring identifiers of a predetermined number of trusted nodes, the predetermined number being associated with a secret sharing scheme to be used; generating a predetermined number of shared portion sets from input data by using the identifiers respectively as parameters of the secret sharing scheme; and respectively storing the predetermined number of shared portion sets in the predetermined number of trusted nodes according to a correspondence relationship between the predetermined number of shared portion sets and the predetermined number of trusted nodes. With the technical solution of the present disclosure, input data can be efficiently protected with trusted nodes by using a secret sharing scheme, and the confidentiality and integrity of the input data can be guaranteed.

20 Claims, 5 Drawing Sheets

(56) References Cited

U.S. PATENT DOCUMENTS

| | | | |
|---|---|---|---|
| 10,411,897 B2* | 9/2019 | Paolini-Subramanya | .................... H04L 63/123 |
| 10,908,837 B2* | 2/2021 | Fetik | ..................... G06F 3/0653 |
| 10,944,566 B2* | 3/2021 | Harnik | .................. H04L 9/3234 |
| 11,403,009 B2* | 8/2022 | Wang | ....................... H04L 67/63 |
| 2015/0186671 A1* | 7/2015 | O'Hare | ................. H04L 9/0894 713/167 |

OTHER PUBLICATIONS

B. Ur et al., "Do Users' Perceptions of Password Security Match Reality?" Proceedings of the 2016 CHI Conference on Human Factors in Computing Systems, May 2016, pp. 3748-3760.

Ofcom, "UK Adults Taking Online Password Security Risks," https://www.ofcom.org.uk/about-ofcom/latest/media/media-releases/2013/uk-adults-taking-online-password-security-risks, Apr. 23, 2013, 4 pages.

N. Lomas, "GitHub Accounts Targeted in Password Reuse Attack," https://techcrunch.com/2016/06/16/github-accounts-targeted-in-password-reuse-attack/, Jun. 16, 2016, 9 pages.

H. Birkholz et al., "Remote Attestation Procedures Architecture," https://tools.ietf.org/id/draft-ietf-rats-architecture-05.html, Jul. 10, 2020, 26 pages.

A. Shamir, "How to Share a Secret," Communications of the ACM, vol. 22, No. 11, Nov. 1979, pp. 612-613.

* cited by examiner

DATA STORAGE METHOD, DATA READ METHOD, ELECTRONIC DEVICE, AND PROGRAM PRODUCT

RELATED APPLICATION(S)

The present application claims priority to Chinese Patent Application No. 202210074554.0, filed Jan. 21, 2022, and entitled "Data Storage Method, Data Read Method, Electronic Device, and Program Product," which is incorporated by reference herein in its entirety.

FIELD

Embodiments of the present disclosure generally relate to computer technologies, and in particular, to a data storage method, a data read method, an electronic device, and a computer program product that may be used in multi-cloud architectures and local area network environments.

BACKGROUND

Today, data is typically stored in digital format, and such data includes personal data such as resumes, financial reports, medical records, family photos and videos, certificates and keys, and a large number of different social media accounts for different websites. Accordingly to a recent statistical study, American users typically have as many as a hundred or more accounts for storing such personal data. Managing so much personal data is an increasingly serious problem, because such information can be highly sensitive. It potentially tells others who we are and what kind of people we are, but there are some things that we just don't want to let others know. However, unless a person is a security expert, how to achieve confidentiality and security is usually far beyond his or her capabilities. As a result, information privacy and ransomware become more and more sensitive.

Storing copies in a multi-cloud architecture can solve the problem of local storage failure, but introduces a single-point problem in today's zero trust network environment. In addition, encrypted storage also has its problems, such as key management and re-keying. Conventional secret sharing can solve the above problems while keeping confidentiality and integrity, but there is an availability problem because it is difficult to reconstruct the secret if shared portions are stored remotely in multiple clouds. Therefore, there is currently no trusted data network implementation technique in the industry that can efficiently protect input data and ensure the confidentiality and integrity of input data.

SUMMARY

Embodiments of the present disclosure provide a data storage method, a data read method, an electronic device, and a computer program product.

In a first aspect of the present disclosure, a data storage method is provided. The method includes: acquiring identifiers of a predetermined number of trusted nodes, the predetermined number being associated with a secret sharing scheme to be used; generating a predetermined number of shared portion sets from input data by using the identifiers respectively as parameters of the secret sharing scheme; and respectively storing the predetermined number of shared portion sets in the predetermined number of trusted nodes according to a correspondence relationship between the predetermined number of shared portion sets and the predetermined number of trusted nodes.

In a second aspect of the present disclosure, a data storage method is provided. The method includes: acquiring input data; and sending the input data to a predetermined number of trusted nodes associated with a to-be-used secret sharing scheme for generating, by each of the predetermined number of trusted nodes, a shared portion set from the input data by using an identifier of the trusted node as a parameter of the secret sharing scheme.

In a third aspect of the present disclosure, a data read method is provided. The method includes: respectively acquiring, from a predetermined number of trusted nodes, at least a further predetermined number of shared portion sets, the predetermined number and the further predetermined number being associated with a secret sharing scheme used when generating the further predetermined number of shared portion sets for input data, and the predetermined number being greater than or equal to the further predetermined number; and generating, based on the secret sharing scheme, the input data from the further predetermined number of shared portion sets by using identifiers of the further predetermined number of trusted nodes, the further predetermined number of shared portion sets being respectively acquired from the further predetermined number of trusted nodes.

In a fourth aspect of the present disclosure, an electronic device is provided. The electronic device includes: at least one processing unit; and at least one memory coupled to the at least one processing unit and storing instructions for execution by the at least one processing unit, wherein the instructions, when executed by the at least one processing unit, cause the device to perform actions comprising: acquiring identifiers of a predetermined number of trusted nodes, the predetermined number being associated with a secret sharing scheme to be used; generating a predetermined number of shared portion sets from input data by using the identifiers respectively as parameters of the secret sharing scheme; and respectively storing the predetermined number of shared portion sets in the predetermined number of trusted nodes according to a correspondence relationship between the predetermined number of shared portion sets and the predetermined number of trusted nodes.

In a fifth aspect of the present disclosure, an electronic device is provided. The electronic device includes: at least one processing unit; and at least one memory coupled to the at least one processing unit and storing instructions for execution by the at least one processing unit, wherein the instructions, when executed by the at least one processing unit, cause the device to perform actions comprising: acquiring input data; and sending the input data to a predetermined number of trusted nodes associated with a to-be-used secret sharing scheme for generating, by each of the predetermined number of trusted nodes, a shared portion set from the input data by using an identifier of the trusted node as a parameter of the secret sharing scheme.

In a sixth aspect of the present disclosure, an electronic device is provided. The electronic device includes: at least one processing unit; and at least one memory coupled to the at least one processing unit and storing instructions for execution by the at least one processing unit, wherein the instructions, when executed by the at least one processing unit, cause the device to perform actions comprising: respectively acquiring, from a predetermined number of trusted nodes, at least a further predetermined number of shared portion sets, the predetermined number and the further predetermined number being associated with a secret sharing scheme used when generating the further predetermined number of shared portion sets for input data, and the predetermined number being greater than or equal to the further predetermined number; and generating, based on the secret sharing scheme, the input data from the further predetermined number of shared portion sets by using identifiers of the further predetermined number of trusted nodes, the further predetermined number of shared portion sets being respectively acquired from the further predetermined number of trusted nodes.

In a seventh aspect of the present disclosure, a computer program product is provided. The computer program product is tangibly stored on a non-transitory computer-readable medium and includes machine-executable instructions that, when executed by a machine, cause the machine to perform any step of the method described according to the first aspect of the present disclosure.

In an eighth aspect of the present disclosure, a computer program product is provided. The computer program product is tangibly stored on a non-transitory computer-readable medium and includes machine-executable instructions that, when executed by a machine, cause the machine to perform any step of the method described according to the second aspect of the present disclosure.

In a ninth aspect of the present disclosure, a computer program product is provided. The computer program product is tangibly stored on a non-transitory computer-readable medium and includes machine-executable instructions that, when executed by a machine, cause the machine to perform any step of the method described according to the third aspect of the present disclosure.

This Summary is provided to introduce the selection of concepts in a simplified form, which will be further described in the Detailed Description below. The Summary is neither intended to identify key features or essential features of embodiments of the present disclosure, nor intended to limit the scope of embodiments of the present disclosure.

BRIEF DESCRIPTION OF THE DRAWINGS

The above and other objectives, features, and advantages of the present disclosure will become more apparent from description provided herein of example embodiments of the present disclosure, in combination with the accompanying drawings. In the example embodiments of the present disclosure, the same reference numerals generally represent the same parts.

Identical or corresponding numerals represent identical or corresponding parts in various accompanying drawings.

DETAILED DESCRIPTION

Figure 1:
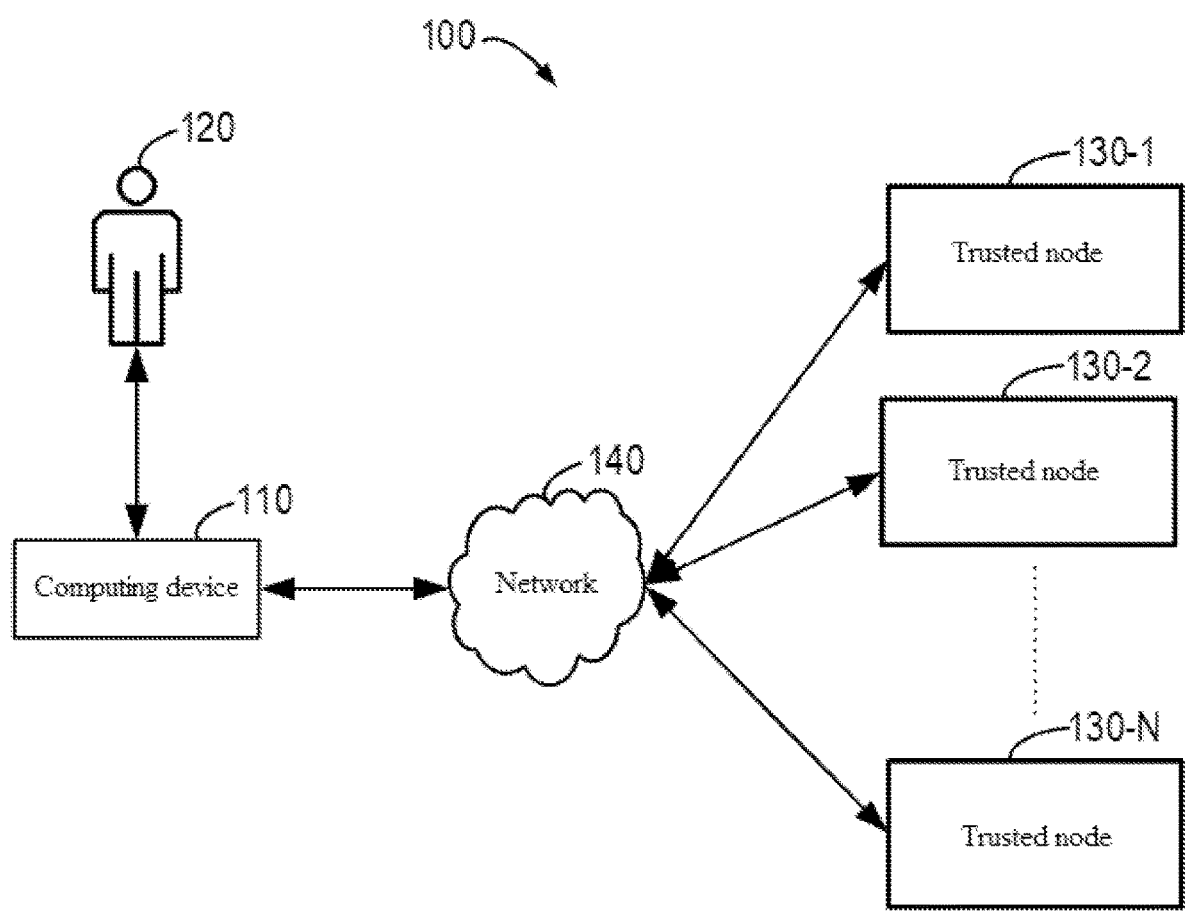
FIG. 1 shows a schematic diagram of a trusted data network in which devices and/or methods according to embodiments of the present disclosure may be implemented.

Example embodiments of the present disclosure will be described in more detail below with reference to the accompanying drawings. Although example embodiments of the present disclosure are shown in the accompanying drawings, it should be understood that the present disclosure may be implemented in various forms and should not be limited by the embodiments set forth herein. Rather, these embodiments are provided to make the present disclosure more thorough and complete and to fully convey the scope of the present disclosure to those skilled in the art.

As used herein, the term "include" and variations thereof mean open-ended inclusion, for example, "including but not limited to." Unless otherwise stated, the term "or" means "and/or." The term "based on" denotes "at least partially based on." The terms "an example embodiment" and "an embodiment" mean "at least one embodiment." The term "another embodiment" means "at least one further embodiment." The terms "first," "second," and the like may refer to different or the same objects. Other explicit and implicit definitions may also be included below.

As described above, there is currently no trusted data network implementation technique in the industry that can efficiently protect input data and ensure the confidentiality and integrity of input data. Specifically, a common method for most people to protect such sensitive information is to save the information as a different digital file into a special directory, or to then encrypt the directory, with the hope that they will not forget the encryption key, and sometimes they will collect various encryption keys into another file and encrypt the file. However, this solution has its inconveniences. First, to ensure the security of an encrypted directory/file, a user must periodically change an encryption key. Since an attacker may choose to use a plaintext attack, using the same key for a long time may compromise the key. Meanwhile, if the user periodically changes the key, it is a burden for the user to remember the current key, since the best key is a randomly generated bit string, and in fact, such a key itself becomes sensitive. In addition, each time the key is changed, the user must first decrypt the directory/file with the old key and then re-encrypt with a new key, which is very time-consuming for large directories/files, especially when the directories/files are stored remotely in a public cloud. Finally, it is well known that people frequently re-use the same password on multiple sites, resulting in some terrible chain attacks.

Another risk of the above solution is a possible local storage medium failure. Therefore, people would typically save many copies of data directories/files in different cloud memories, whether encrypted or unencrypted. However, today's network defense will take a zero trust assumption, assuming that an attacker will be present inside the used network, so everything may be vulnerable to attacks.

In order to solve this problem, secret sharing and multi-computation have become very popular research points in today's academia, which divides a secret into multiple shares between two or more sites with strong separation therebetween, and never exposes all secret shares at any one point at any time. The shares may then be operated using multiple computations without being combined together. The characteristic of this "secret sharing scheme" is that if a sufficient number of shares are not combined together, attackers cannot learn anything, and will be forced to destroy multiple sites, so that a single-point failure can be avoided.

Secret sharing, also known as secret splitting, refers to a method of splitting a secret into shared portions and assigning the shared portions to n participants, each participant being assigned with one or more shared portions, just like the stocks of a company. Only when t shared portions are combined, a secret can be reconstructed. A secret cannot be reconstructed when only fewer than t shared portions are obtained. Such a system is called a (t, n) scheme.

A Shamir algorithm, developed by Adi Shamir, is one of the popular algorithms to implement the (t, n) secret sharing scheme with polynomials. The Shamir algorithm is also referred to herein as the Shamir secret sharing scheme. The following shows how a (3, 5) secret sharing scheme is implemented using a second-order polynomial $F(x_t)=ax^2+bx+M$:

Assuming that a=7 and b=8 are selected randomly, secret M to be protected has a value of 11, and a prime number p, 13, which is larger than M is selected. At this moment, $F(x)=(7x^2+8x+11)$ mod 13, and 5 shared portions are respectively:

$$k_1=F(1)=7+8+11=0(\text{mod } 13)$$

$$k_2=F(2)=28+16+11=3(\text{mod } 13)$$

$$k_3=F(3)=63+24+11=7(\text{mod } 13)$$

$$k_4=F(4)=112+32+11=12(\text{mod } 13)$$

$$k_5=F(5)=175+40+11=5(\text{mod } 13)$$

In order to reconstruct secret M from 3 of these shared portions, a linear equation set is solved, e.g., by using $k_2$, $k_3$, and $k_5$:

$$F(2)=a \cdot 2^{2}+b \cdot 2+M=3(\text{mod } 13)$$

$$F(3)=a \cdot 3^{2}+b \cdot 3+M=7(\text{mod } 13)$$

$$F(5)=a \cdot 5^{2}+b \cdot 5+M=5(\text{Mod } 13)$$

By solving the above linear equation set, a=7, b=8, and M=11 may be obtained, so that the value of secret M is successfully derived.

Various types of data may be subjected to sharing protection with a secret sharing scheme. For example, a secret to be protected may be an image or a photograph. At this moment, a plurality of sub-images as shared portions may be generated for the original image, the size of the sub-images may be the same as the original image, but any sub-image is completely different from the original image since each pixel point includes a different value from a corresponding pixel point of the original image, and the original image can be recovered only if a required number of sub-images of the adopted secret sharing scheme are obtained.

When reconstructing an original secret by obtaining a sufficient number of shared portions, a multi-party computation (MPC) scheme may be used.

In the secret sharing scheme, no key or password may be used to protect a secret, since the secret is hidden in the shared portion, and thus no additional encryption may be required.

As previously described, secret sharing and MPC may be utilized to protect sensitive information and reconstruct sensitive information from a plurality of shared portions in a multi-cloud storage apparatus. However, to date, this has been just one idea in academia, as there are many limitations to the implementation of MPC.

For example, implementation of MPC may include scrambling circuits, linear secret sharing, full homomorphic encryption, and homomorphic secret sharing. However, scrambling circuits and linear secret sharing schemes are based on scrambling circuit, GMW, or BGW implementations. In such implementations, for each multiplication gate (ADD) and for each input bit into the gate, if there are n participants participating in the computation, there will be n×(n−1) communications. For example, an advanced encryption standard (AES) implementation will result in several gigabits of traffic. This is not a very serious problem in a local area network (LAN) environment, but it becomes impossible for a multi-cloud secret sharing application. Full homomorphic encryption and homomorphic secret sharing are very interesting and active research topics in academia, but cannot be used in practical applications right now, even in a single-host computing environment.

It can be seen that although secret sharing combined with an MPC scheme would be advantageous, it is still only an interesting and active research field in academia, and there is no implementation or proof of concept (PoC) in the industry.

To address, at least in part, one or more of the above problems and other potential problems, embodiments of the present disclosure provide a solution that not only can optimize MPC to protect shared portions, but also can provide a complete and easy-to-use solution for end-users, even if the users are not security experts.

According to embodiments of the present disclosure, a trusted execution environment (TEE), which may be referred to as a trusted node, is employed.

The TEE may be implemented using hardware-assisted functions, and applications may use the TEE to fill protected user code and data in an enclave. Once activated, the TEE will protect the code and data in the enclave from external access and modification.

Specifically, the TEE may provide the following functions:

Isolated Computing Environment: this environment may be referred to as an enclave for protecting code and data from access and modification by other parties, such as an operating system/hypervisor itself or other applications.

Certification Service: the service will certify software provided by a customer for loading into the enclave. In general, this service enables customers to be confident that:

a) Low Level Hardware Platform is trusted: If a central processing unit (CPU) is genuine, firmware and microcode are secure from malicious tampering by a third party.

b) Application software such as code or data is trusted, i.e., the code or data of the software is not tampered with or modified by other malicious parties.

c) The installation process of the software is trusted, i.e., the software, when installed into a platform, is installed fully according to a defined manner without being changed or tampered with by other malicious parties.

With these three aspects of trust, customers can be reassured that their applications are secure and will not be maliciously utilized.

Supply Service: this service will provide confidentiality for the software by supplying secrets to the enclave at runtime. After a customer certifies or verifies the software, the customer can be confident that all content about applications, hardware, or software is secure, and they can then provide their secrets or sensitive data to the application running in the enclave.

Other services such as sealing, migration, and revocation.

FIG. 1 shows a schematic block diagram of trusted data network 100 in which devices and/or methods according to embodiments of the present disclosure may be implemented. According to an embodiment of the present disclosure, trusted data network 100 may be a cloud environment.

As shown in FIG. 1, trusted data network 100 includes computing device 110, a plurality of trusted nodes 130-1, 130-2, . . . , 130-N (hereinafter collectively referred to as trusted node 130), and network 140. Computing device 110 may interact with user 120 to acquire data from user 120, such as instructions, input data, and input parameters, and may interact with trusted node 130 via network 140 to transmit data. According to an embodiment of the present disclosure, computing device 110 may also be a trusted node or may be located in trusted node 130. Therefore, according to some embodiments of the present disclosure, computing device 110 is only used to interact with user 120 and trusted node 130. According to some other embodiments of the present disclosure, computing device 110 not only may be used to interact with user 120 and trusted node 130, but also may be used as trusted node 130 for operation. Therefore, computing device 110 may be located in one trusted node, or each trusted node may include a computing device with the same or similar functions as computing device 110.

Trusted node 130 may be used to store a shared portion set generated by computing device 110 using a secret sharing scheme according to input data received from user 120, or may be used to receive input data from computing device 110 and then generate a shared portion set, which may include one or more shared portions. According to an embodiment of the present disclosure, trusted node 130 may be a TEE.

According to an embodiment of the present disclosure, network 140 may include any form of network connection such as a virtual private network or an Internet protocol secure (IPSec) connection, and the scope of protection of the present disclosure is not limited to this.

Figure 2:
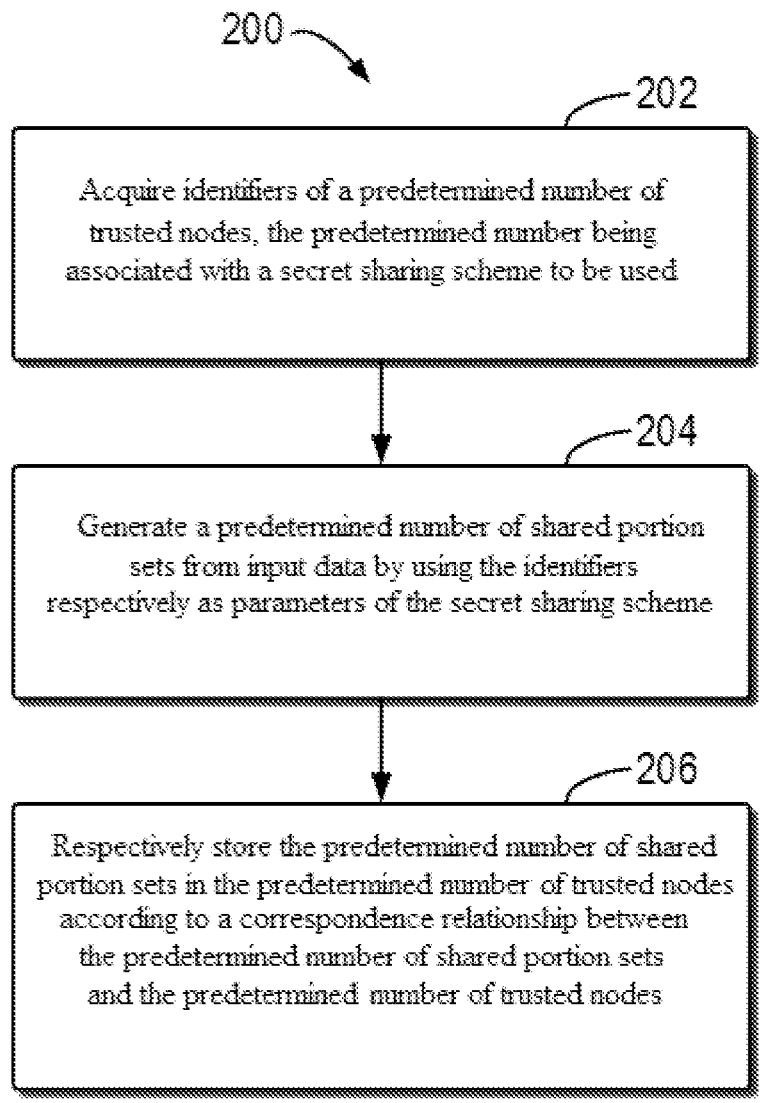
FIG. 2 shows a flow chart of a data storage method according to an embodiment of the present disclosure.

FIG. 2 shows a flow chart of data storage method 200 according to an embodiment of the present disclosure. Data storage method 200 may be implemented by computing device 110 shown in FIG. 1 or by other appropriate devices. It should be understood that data storage method 200 may also include additional steps not shown and/or may omit the steps shown, and the scope of embodiments of the present disclosure is not limited in this regard.

At block 202, computing device 110 acquires identifiers of a predetermined number of trusted nodes. According to an embodiment of the present disclosure, the predetermined number is associated with a secret sharing scheme to be used. For example, computing device 110 may receive from user 120 an instruction specifying a secret sharing scheme to be used, and the instruction may further indicate the number of trusted nodes to be used, which are associated with the secret sharing scheme to be used. In addition, computing device 110 may also be bound with a default secret sharing scheme so that the default secret sharing scheme may be used directly for received secrets.

According to an embodiment of the present disclosure, identifiers of trusted nodes may be digital or may be embodied in a digital form so that different identifiers of different trusted nodes may be easily introduced for computation when using a secret sharing scheme.

According to an embodiment of the present disclosure, computing device 110 may determine an identifier for each of a predetermined number of trusted nodes in response to an indication from user 120 or automatically. It will be appreciated that identifiers of different trusted nodes are different, so that when computing using a secret sharing scheme and referencing the identifiers of different trusted nodes, the obtained shared portion sets are also different.

At block 204, computing device 110 generates a predetermined number of shared portion sets from input data by using the identifiers obtained at block 202 respectively as parameters of the secret sharing scheme.

According to an embodiment of the present disclosure, computing device 110 may acquire input data from user 120 or other data sources. The input data may include various data such as text data, image data, audio data, and video data. After acquiring the input data, computing device 110 may generate a predetermined number of shared portion sets from the input data, for example, in accordance with the Shamir secret sharing scheme described previously. When generating the predetermined number of shared portion sets from the input data, for a random parameter in the used secret sharing scheme, computing device 110 may receive an indication of a random parameter value from user 120 or may determine a random parameter value according to default data.

According to some embodiments of the present disclosure, computing device 110, when generating the predetermined number of shared portion sets from the input data, may first divide the input data into a plurality of input data portions and then generate, by using one of the identifiers obtained at block 202 as a parameter of the secret sharing scheme, each shared portion in a shared portion set corresponding to the identifier from each of the plurality of input data portions. For example, computing device 110 may divide the input data by each byte, by every two bytes, by every four bytes, or by an arbitrarily selected number of bytes to obtain a plurality of input data portions, and perform computation using the secret sharing scheme to obtain each corresponding shared portion in the shared portion set. It should be noted that the input data may in some embodiments be computed byte by byte, so that a fine granularity may be used for a higher level of protection of the input data.

According to some other embodiments of the present disclosure, computing device 110, when generating the predetermined number of shared portion sets from the input data, may first divide the input data into a plurality of input data portions. Computing device 110 may then generate, by using one of the predetermined number of identifiers as a parameter of the secret sharing scheme, a shared portion in a shared portion set corresponding to this identifier from one of the plurality of input data portions. At this moment, computing device 110 stores a correspondence relationship between the input data portion and the shared portion in a lookup table. Finally, computing device 110, when generating a further shared portion in the shared portion set from a further input data portion in the plurality of input data portions, may determine the shared portion as the further shared portion through the lookup table if the further input data portion is the same as the input data portion.

In this way, repeated computations of the same input data portion in the input data can be avoided, so that the amount of computations using the secret sharing scheme can be saved, and thus the computation process can be accelerated. In these embodiments, the input data may also be computed byte by byte so that the number of computations of the same content, i.e., the same byte, can be minimized.

For example, taking the Shamir secret sharing scheme described previously as an example, once a, b, and x (trusted node identifiers) are determined, F(x) for each different M may be determined. Therefore, when input data are in bytes, all F(x) for all different M, i.e., 0-255, may be computed, and a correspondence relationship between these M and the corresponding shared portions is saved in a lookup table. In this case, only 256 computations may be needed, and then the shared portion set may be generated from the input data through lookup.

At block 206, computing device 110 respectively stores the predetermined number of shared portion sets in the predetermined number of trusted nodes according to a correspondence relationship between the predetermined number of shared portion sets and the predetermined number of trusted nodes. According to an embodiment of the present disclosure, after computing device 110 generates the predetermined number of shared portion sets from the input data at block 204, since the trusted nodes, the identifiers of the trusted nodes, and the generated shared portion sets are in a one-to-one correspondence, computing device 110 may send the predetermined number of shared portion sets to the predetermined number of trusted nodes respectively through network 140 according to the correspondence, and store the received shared portion sets respectively by the trusted nodes.

In data storage method 200, computing device 110 itself may also be a trusted node. At this moment, computing device 110 may use itself as a trusted node to compute a corresponding shared portion set for itself and may store the shared portion set.

In addition, in data storage method 200, the operation of computing the shared portion set from the input data using the secret sharing scheme is performed by computing device 110, and consequently the processing pressure of computing device 110 is large. According to some other embodiments of the present disclosure, the foregoing computing process may also be performed by trusted node 130 so that the processing pressure of computing device 110 can be relieved. These embodiments are described in detail below in conjunction with FIG. 3.

Figure 3:
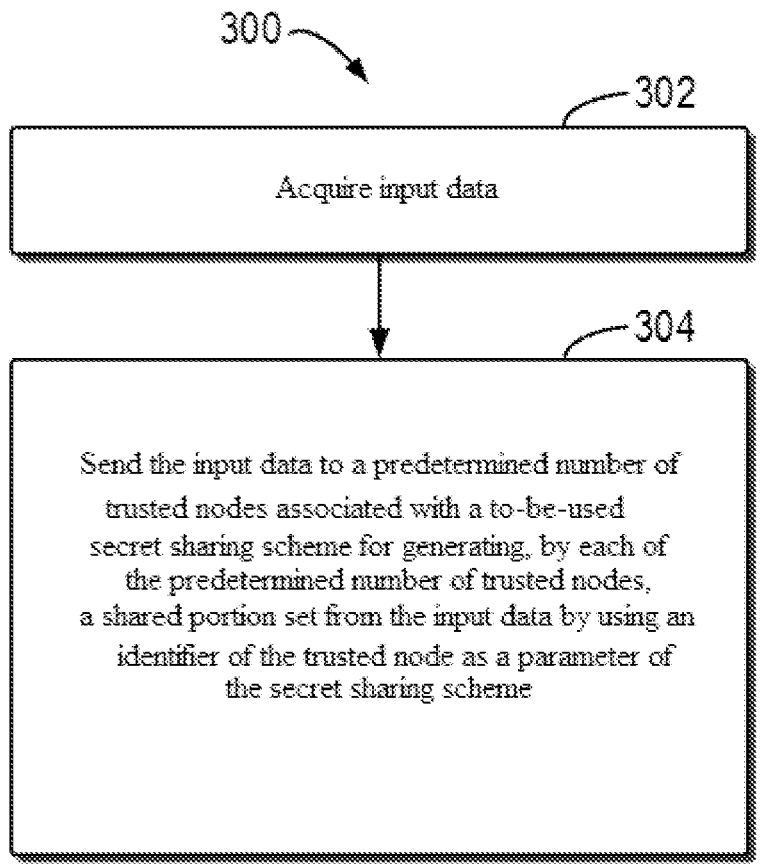
FIG. 3 shows a flow chart of a data storage method according to an embodiment of the present disclosure.

FIG. 3 shows a flow chart of data storage method 300 according to an embodiment of the present disclosure. Data storage method 300 may be implemented by computing device 110 shown in FIG. 1, or by other appropriate devices. It should be understood that data storage method 300 may also include additional steps not shown and/or may omit the steps shown, and the scope of embodiments of the present disclosure is not limited in this regard.

At block 302, computing device 110 acquires input data. As previously described, according to an embodiment of the present disclosure, computing device 110 may acquire input data from user 120 or other data sources.

At block 304, computing device 110 sends the input data to a predetermined number of trusted nodes associated with a to-be-used secret sharing scheme for generating, by each of the predetermined number of trusted nodes, a shared portion set from the input data by using an identifier of the trusted node as a parameter of the secret sharing scheme.

According to an embodiment of the present disclosure, computing device 110 may determine an identifier for each of a predetermined number of trusted nodes in response to an indication from user 120 or automatically.

According to some embodiments of the present disclosure, the operation of computing device 110 sending the input data to a predetermined number of trusted nodes associated with a to-be-used secret sharing scheme may include the following steps: sending the input data to the predetermined number of trusted nodes for each of the predetermined number of trusted nodes to: divide the input data into a plurality of input data portions; and generating, by using the identifier as the parameter of the secret sharing scheme, each shared portion in the shared portion set from each of the plurality of input data portions. For example, computing device 110 may divide the input data by each byte, by every two bytes, by every four bytes, or by an arbitrarily selected number of bytes to obtain a plurality of input data portions, and perform computation using the secret sharing scheme to obtain each corresponding shared portion in the shared portion set. It should be noted that the input data in some embodiments may be computed byte by byte, so that a fine granularity may be used for a higher level of protection of the input data.

The specific operations involved in the above process are similar to those described above with reference to data storage method 200 and will not be described in detail herein.

According to some other embodiments of the present disclosure, the operation of computing device 110 sending the input data to a predetermined number of trusted nodes associated with a to-be-used secret sharing scheme may include the following steps: sending the input data to the predetermined number of trusted nodes for each of the predetermined number of trusted nodes to: divide the input data into a plurality of input data portions; and generate, by using the identifier as the parameter of the secret sharing scheme, a shared portion in the shared portion set from one of the plurality of input data portions; store a correspondence relationship between the input data and the shared portion in a lookup table; and when generating a further shared portion in the shared portion set from a further input data portion in the plurality of input data portions, if the further input data portion is the same as the input data portion, determine the shared portion as the further shared portion by the lookup table.

In this way, repeated computations of the same input data portion in the input data can be avoided, so that the amount of computations using the secret sharing scheme can be reduced, and thus the computation process can be accelerated. In these embodiments, the input data may also be computed byte by byte so that the number of computations of the same content, i.e., the same byte, can be minimized.

The specific operations involved in the above process are similar to those described above with reference to data storage method 200 and will not be described in detail herein.

After the shared portion sets are respectively stored in trusted node 130, the input data may be recovered by reading the shared portion sets from trusted node 130 when it is necessary to use or acquire the input data. This process is described in detail below in conjunction with FIG. 4.

Figure 4:
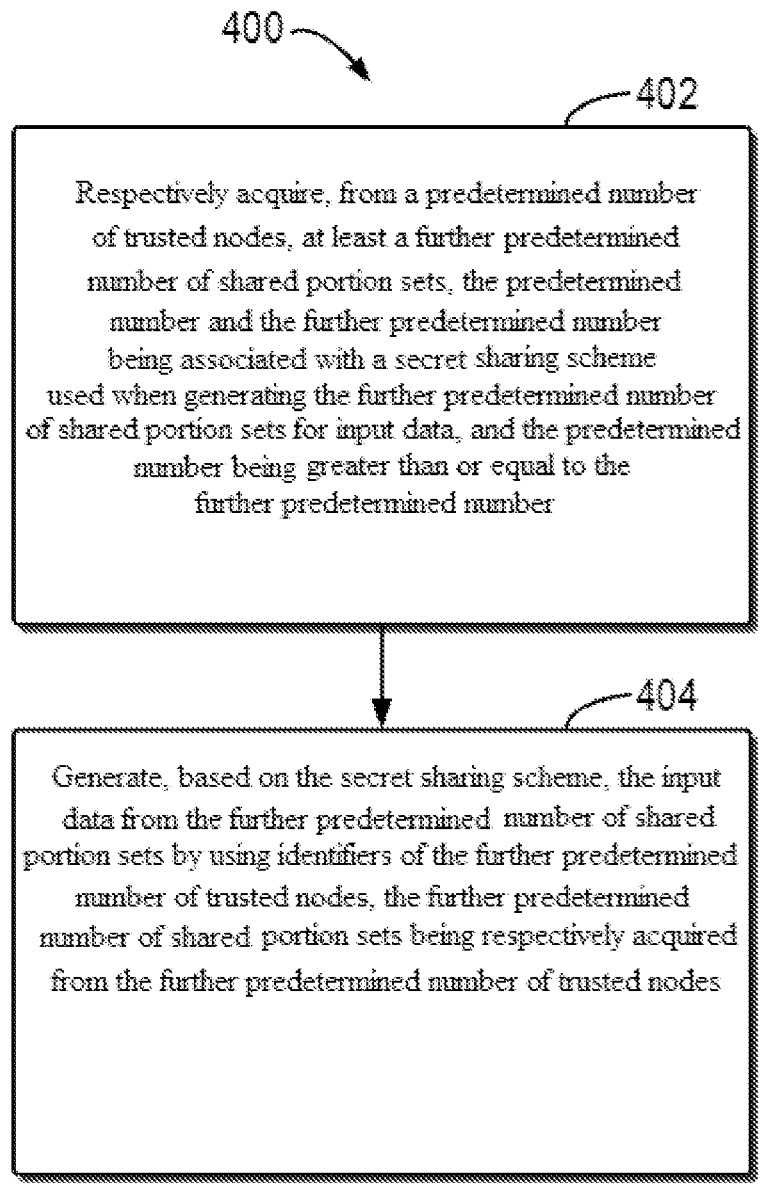
FIG. 4 shows a flow chart of a data read method according to an embodiment of the present disclosure.

FIG. 4 shows a flow chart of data read method 400 according to an embodiment of the present disclosure. Data read method 400 may be implemented by computing device 110 shown in FIG. 1, or by other appropriate devices. It should be understood that data read method 400 may also include additional steps not shown and/or may omit the steps shown, and the scope of embodiments of the present disclosure is not limited in this regard.

At block 402, computing device 110 respectively acquires, from a predetermined number of trusted nodes, at least a further predetermined number of shared portion sets. According to an embodiment of the present disclosure, the predetermined number and the further predetermined number are associated with a secret sharing scheme used when generating the further predetermined number of shared portion sets for input data, and the predetermined number is greater than or equal to the further predetermined number.

According to an embodiment of the present disclosure, when input data needs to be used or acquired, computing device 110 may send a shared portion set read request to all of the predetermined number of trusted nodes that store corresponding shared portion sets. Taking the Shamir secret sharing scheme described previously as an example, since it takes a polynomial implementation (t, n), the number of all the predetermined number of trusted nodes that store the corresponding shared portion sets is n.

According to an embodiment of the present disclosure, a time delay for computing device 110 to receive the shared portion sets from different trusted nodes 130 may be unknown, and computing device 110 is unaware of the temporal order in which the shared portion sets are received from trusted node 130. In accordance with the Shamir secret sharing scheme, computing device 110 may recover the input data after t shared portion sets are acquired. Therefore, computing device 110 may not continue to receive shared portion sets from other trusted nodes after receiving t shared portion sets.

At block 404, computing device 110 generates, based on the secret sharing scheme, the input data from the further predetermined number of shared portion sets described above by using identifiers of the further predetermined number of trusted nodes, the further predetermined number of shared portion sets being respectively acquired from the further predetermined number of trusted nodes described above.

According to some embodiments of the present disclosure, taking the Shamir secret sharing scheme described previously as an example, computing device 110 may generate, after receiving t shared portion sets, input data by solving a linear equation set and using the shared portion sets.

According to some embodiments of the present disclosure, data storage method 200, data storage method 300, and data read method 400 may be implemented as follows. For example, they may be integrated into a user interface provided by an operating system. Specifically, in Windows, data storage method 200, data storage method 300, and data read method 400 may be named "secret sharing" and integrated into a right-key menu of a file/directory of a Windows resource manager as a command Windows extended application programming interface. In an Android mobile device, a corresponding "secret sharing" operation may be added in an application user interface.

According to some embodiments of the present disclosure, other security measures may also be integrated if data storage method 200, data storage method 300, and data read method 400 are run on a mobile device, e.g., fast identity online (FIDO) biometric certification, such as fingerprints, faces, and irises.

According to some embodiments of the present disclosure, trusted nodes may be implemented using different TEE technologies, as long as the implementations are compliant with a remote certification framework, such as that defined in an Internet Engineering Task Force (IETF) request for comments (RFC) document entitled "Remote Attestation Procedures Architecture," draft-ietf-rats-architecture-05, 10 Jul. 2020, which is incorporated by reference herein in its entirety.

According to some embodiments of the present disclosure, trusted node 130 may also operate as computing device 110. In other words, trusted nodes 130 may also act as initiators of data storage method 200, data storage method 300, and data read method 400 and may initiate the execution of these method steps, e.g., by interacting with user 120, as long as these trusted nodes 130 may be addressed, e.g., through a public Internet protocol address.

According to some embodiments of the present disclosure, some preparatory steps may be included prior to the execution of specific steps of data storage method 200, data storage method 300, and data read method 400.

First, trusted node 130 is deployed in trusted data network 100. User 120 may then configure trusted node 130 through computing device 110. For example, a user may configure a user name and a password for logging in and using each trusted node 130, and may configure parameters in the secret sharing scheme to be used, e.g., t and n in the (t, n) secret sharing scheme. Typically, n is a total number of cloud storage apparatuses rented by the user, and t≥2. As t is larger, the input data as a secret is more secure, but the delay may be longer, and the overhead may be larger. In addition, user 120 may configure an Internet protocol address or port number of each trusted node 130, which may be used for remote certification, and a transport layer security (TLS) channel may be automatically established between different TEEs through negotiation. Further, user 120 may configure an identifier for each trusted node 130 as previously described, and may configure a time threshold for sleeping or shutting down a certain trusted node if the trusted node is idle.

Then, when user 120 initiates data storage method 200, data storage method 300, or data read method 400 through computing device 110, computing device 110 may read the Internet protocol address or port number of trusted node 130 that needs to be used from the configuration of trusted data network 100 and initiate a certification process to each trusted node according to the remote certification framework defined in the RFC.

Thereafter, computing device 110 establishes a TLS connection with each trusted node 130, and the specific steps of data storage method 200, data storage method 300, and data read method 400 may be started.

Trusted data network 100 in which the devices and/or methods according to embodiments of the present disclosure may be implemented, data storage method 200 according to an embodiment of the present disclosure, data storage method 300 according to an embodiment of the present disclosure, and data read method 400 according to an embodiment of the present disclosure are described above with reference to FIGS. 1 to 4. It should be understood that the above description is to better demonstrate the content recorded in embodiments of the present disclosure, and is not intended to limit the present disclosure in any way.

It should be understood that the numbers of various elements and the magnitudes of physical quantities used in embodiments of the present disclosure and the drawings are only examples, and are not intended to limit the protection scope of embodiments of the present disclosure. The above numbers and magnitudes may be arbitrarily set as needed without affecting the normal implementation of embodiments of the present disclosure.

As described above with reference to FIGS. 1 to 4, with the technical solutions according to embodiments of the present disclosure, input data can be efficiently protected with trusted nodes by using a secret sharing scheme, and the confidentiality and integrity of the input data can be guaranteed.

Specifically, the technical solutions according to embodiments of the present disclosure may have the following advantageous effects.

With the technical solutions according to embodiments of the present disclosure, the single-point failure problem can be avoided, because different shared portion sets are stored in a multi-cloud storage apparatus in a zero trust network environment.

With the technical solutions according to embodiments of the present disclosure, since original secrets are reconstructed from t of n shared portion sets, if some shared portion sets are inaccessible or fail, initial secrets may still be recovered.

With the technical solutions according to embodiments of the present disclosure, secrets are exchanged between different sites using a TEE instead of an MPC scrambling circuit or homomorphic encryption, thereby enabling practical use in a multi-cloud wide area network (WAN) environment.

The technical solutions according to embodiments of the present disclosure may be implemented using different TEEs in different confidential computing environments of different clouds. For example, the technical solutions may be implemented using Intel SGX, which is supported by Microsoft Corporation, AMD SEV, which is supported by Google Cloud, and using Trustzone in a mobile phone as a local computing device.

The technical solutions according to embodiments of the present disclosure propose an optimization for implementation of secret sharing, i.e., dedicated to files with lookup tables, so that secret sharing can be implemented more quickly.

The technical solutions according to embodiments of the present disclosure can be easily integrated into different operating systems such as Windows, Linux, or Android, and can be easily used by ordinary people who are not security experts.

The technical solutions according to embodiments of the present disclosure use secret sharing instead of encryption/decryption to reduce the trouble of key management and the work of re-keying, thereby avoiding the complicated process of decrypting a file with an old key and re-encrypting with a new key.

The technical solutions according to embodiments of the present disclosure can be easily extended by customers to implement a key management service (KMS), so that a secret can be further protected.

Figure 5:
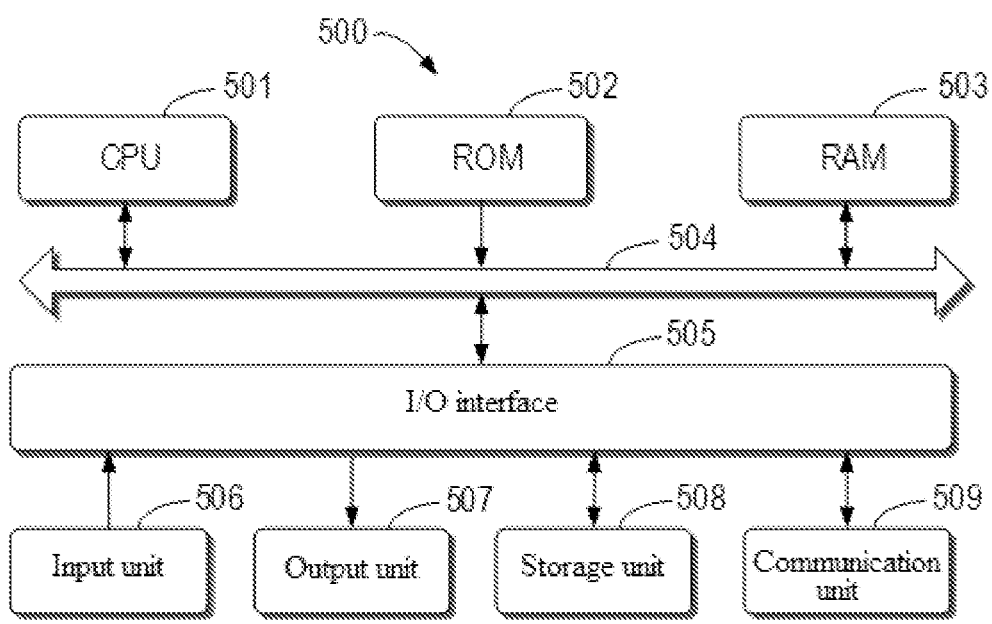
FIG. 5 shows a schematic block diagram of an example device that may be used to implement embodiments of the present disclosure.

FIG. 5 illustrates a schematic block diagram of example device 500 that may be used to implement an embodiment of the present disclosure. According to an embodiment of the present disclosure, computing device 110 in FIG. 1 may be implemented by device 500. As shown in the figure, device 500 includes central processing unit (CPU) 501, which may execute various appropriate actions and processing in accordance with computer program instructions stored in read-only memory (ROM) 502 or computer program instructions loaded from storage unit 508 onto random access memory (RAM) 503. Various programs and data required for the operation of the device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various processes and processing of the methods 200, 300, and 400 described above may be performed by CPU 501. For example, in some embodiments, the methods 200, 300, and 400 may be implemented as a computer software program that is tangibly included in a machine-readable medium such as the storage unit 508. In some embodiments, part of or all the computer program may be loaded and/or installed to device 500 via ROM 502 and/or communication unit 509. When the computer program is loaded to RAM 503 and executed by CPU 501, one or more actions in the methods 200, 300, and 400 described above can be executed.

Embodiments of the present disclosure may relate to a method, a device, a system, and/or a computer program product. The computer program product may include a computer-readable storage medium on which computer-readable program instructions for performing various aspects of embodiments of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples of the computer-readable storage medium as a non-exhaustive list include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage media used herein are not to be interpreted as transient signals per se, such as radio waves or other freely propagating electromagnetic waves, electromagnetic waves propagating through waveguides or other transmission media, for example, light pulses through fiber optic cables, or electrical signal transmitted via electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of embodiments of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where the remote computer is involved, the remote computer may be connected to the user computer over any kind of networks, including a LAN or a WAN, or may be connected to the external computer, for example, through the Internet by using an Internet service provider. In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of embodiments of the present disclosure.

Various aspects of embodiments of the present disclosure are described here with reference to the flow charts and/or block diagrams of the method, the device/system, and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Example embodiments of the present disclosure have been described above. The above description is illustrative, rather than exhaustive, and is not limited to the disclosed various embodiments. Numerous modifications and alterations will be apparent to those of ordinary skill in the art without departing from the scope and spirit of the illustrated embodiments. The selection of terms as used herein is intended to best explain the principles and practical applications of the various embodiments or technical improvements to technologies on the market, so as to enable persons of ordinary skill in the art to understand the embodiments disclosed herein.

What is claimed is:

1. A data storage method, comprising:
   acquiring identifiers of a predetermined number of trusted nodes, the predetermined number being associated with a secret sharing scheme to be used;
   generating a predetermined number of shared portion sets from input data by using the identifiers respectively as parameters of the secret sharing scheme; and
   respectively storing the predetermined number of shared portion sets in the predetermined number of trusted nodes according to a correspondence relationship between the predetermined number of shared portion sets and the predetermined number of trusted nodes;
   wherein the method further comprises:
   computing a plurality of different shared portions of a corresponding one of the shared portion sets for respective different possible values of one or more portions of the input data; and
   storing the different shared portions in association with the different possible values of the one or more portions of the input data for subsequent lookup.

2. The method according to claim 1, wherein acquiring the identifiers comprises:
   determining an identifier for each of the predetermined number of trusted nodes.

3. The method according to claim 1, wherein generating the predetermined number of shared portion sets comprises:
   dividing the input data into a plurality of input data portions; and
   generating, by using one of the identifiers as a parameter of the secret sharing scheme, each shared portion in a shared portion set corresponding to the identifier from each of the plurality of input data portions.

4. The method according to claim 3, wherein a size of each input data portion is one byte.

5. The method according to claim 1, wherein generating the predetermined number of shared portion sets comprises:
   dividing the input data into a plurality of input data portions; and
   generating, by using one of the predetermined number of identifiers as a parameter of the secret sharing scheme, a shared portion in a shared portion set corresponding to the identifier from one of the plurality of input data portions;
   storing a correspondence relationship between the input data portion and the shared portion in a lookup table; and
   when generating a further shared portion in the shared portion set from a further input data portion in the plurality of input data portions, if the further input data portion is the same as the input data portion, determining the shared portion as the further shared portion through the lookup table.

6. A data storage method, comprising:
acquiring input data; and
sending the input data to a predetermined number of trusted nodes associated with a to-be-used secret sharing scheme for generating, by each of the predetermined number of trusted nodes, a shared portion set from the input data by using an identifier of the trusted node as a parameter of the secret sharing scheme;
wherein at least one of the trusted nodes is configured to compute a plurality of different shared portions of a corresponding one of the shared portion sets for respective different possible values of one or more portions of the input data, and to store the different shared portions in association with the different possible values of the one or more portions of the input data for subsequent lookup.

7. The method according to claim 6, further comprising:
determining the identifier for the trusted node.

8. The method according to claim 6, wherein sending the input data to a predetermined number of trusted nodes associated with a to-be-used secret sharing scheme comprises:
sending the input data to the predetermined number of trusted nodes for each of the predetermined number of trusted nodes to:
divide the input data into a plurality of input data portions; and
generate, by using the identifier as the parameter of the secret sharing scheme, each shared portion in the shared portion set from each of the plurality of input data portions.

9. The method according to claim 8, wherein a size of each input data portion is one byte.

10. The method according to claim 6, wherein sending the input data to a predetermined number of trusted nodes associated with a to-be-used secret sharing scheme comprises:
sending the input data to the predetermined number of trusted nodes for each of the predetermined number of trusted nodes to:
divide the input data into a plurality of input data portions; and
generate, by using the identifier as the parameter of the secret sharing scheme, a shared portion in the shared portion set from one of the plurality of input data portions;
store a correspondence relationship between the input data and the shared portion in a lookup table; and
when generating a further shared portion in the shared portion set from a further input data portion in the plurality of input data portions, if the further input data portion is the same as the input data portion, determine the shared portion as the further shared portion through the lookup table.

11. A data read method, comprising:
respectively acquiring, from a predetermined number of trusted nodes, at least a further predetermined number of shared portion sets, the predetermined number and the further predetermined number being associated with a secret sharing scheme used when generating the further predetermined number of shared portion sets for input data, and the predetermined number being greater than or equal to the further predetermined number; and
generating, based on the secret sharing scheme, the input data from the further predetermined number of shared portion sets by using identifiers of the further predetermined number of trusted nodes, the further predetermined number of shared portion sets being respectively acquired from the further predetermined number of trusted nodes;
wherein at least one of the trusted nodes is configured to compute a plurality of different shared portions of a corresponding one of the shared portion sets for respective different possible values of one or more portions of the input data, and to store the different shared portions in association with the different possible values of the one or more portions of the input data for subsequent lookup.

12. An electronic device, comprising:
at least one processing unit; and
at least one memory coupled to the at least one processing unit and storing instructions for execution by the at least one processing unit, wherein the instructions, when executed by the at least one processing unit, cause the electronic device to perform actions comprising:
acquiring identifiers of a predetermined number of trusted nodes, the predetermined number being associated with a secret sharing scheme to be used;
generating a predetermined number of shared portion sets from input data by using the identifiers respectively as parameters of the secret sharing scheme; and
respectively storing the predetermined number of shared portion sets in the predetermined number of trusted nodes according to a correspondence relationship between the predetermined number of shared portion sets and the predetermined number of trusted nodes;
wherein the instructions, when executed by the at least one processing unit, further cause the electronic device to perform actions comprising:
computing a plurality of different shared portions of a corresponding one of the shared portion sets for respective different possible values of one or more portions of the input data; and
storing the different shared portions in association with the different possible values of the one or more portions of the input data for subsequent lookup.

13. The electronic device according to claim 12, wherein acquiring the identifiers comprises:
determining an identifier for each of the predetermined number of trusted nodes.

14. The electronic device according to claim 12, wherein generating the predetermined number of shared portion sets comprises:
dividing the input data into a plurality of input data portions; and
generating, by using one of the identifiers as a parameter of the secret sharing scheme, each shared portion in a shared portion set corresponding to the identifier from each of the plurality of input data portions.

15. The electronic device according to claim 12, wherein generating the predetermined number of shared portion sets comprises:
dividing the input data into a plurality of input data portions; and
generating, by using one of the predetermined number of identifiers as a parameter of the secret sharing scheme, a shared portion in a shared portion set corresponding to the identifier from one of the plurality of input data portions;

storing a correspondence relationship between the input data portion and the shared portion in a lookup table; and when generating a further shared portion in the shared portion set from a further input data portion in the plurality of input data portions, if the further input data portion is the same as the input data portion, determining the shared portion as the further shared portion through the lookup table.

16. An electronic device, comprising:

at least one processing unit; and at least one memory coupled to the at least one processing unit and storing instructions for execution by the at least one processing unit, wherein the instructions, when executed by the at least one processing unit, cause the electronic device to perform the method of claim 6.

17. An electronic device, comprising:

at least one processing unit; and at least one memory coupled to the at least one processing unit and storing instructions for execution by the at least one processing unit, wherein the instructions, when executed by the at least one processing unit, cause the electronic device to perform the method of claim 11.

18. A computer program product tangibly stored on a non-transitory computer-readable medium and comprising machine-executable instructions that, when executed by a machine, cause the machine to perform the method of claim 1.

19. A computer program product tangibly stored on a non-transitory computer-readable medium and comprising machine-executable instructions that, when executed by a machine, cause the machine to perform the method of claim 6.

20. A computer program product tangibly stored on a non-transitory computer-readable medium and comprising machine-executable instructions that, when executed by a machine, cause the machine to perform the method of claim 11.

* * * * *